(12) United States Patent
Faulkner

(10) Patent No.: US 9,179,010 B2
(45) Date of Patent: Nov. 3, 2015

(54) REMOTE POWERED NODE

(75) Inventor: David W Faulkner, Suffolk (GB)

(73) Assignee: BRITISH TELECOMMUNICATIONS PUBLIC LIMITED COMPANY, LONDON (GB)

( * ) Notice: Subject to any disclaimer, the term of this patent is extended or adjusted under 35 U.S.C. 154(b) by 1159 days.

(21) Appl. No.: 12/597,779

(22) PCT Filed: Apr. 24, 2008

(86) PCT No.: PCT/GB2008/001448
§ 371 (c)(1),
(2), (4) Date: Oct. 27, 2009

(87) PCT Pub. No.: WO2008/135716
PCT Pub. Date: Nov. 13, 2008

(65) Prior Publication Data
US 2010/0086123 A1    Apr. 8, 2010

(30) Foreign Application Priority Data
May 2, 2007  (EP) .................................. 07251850

(51) Int. Cl.
*H04M 9/00*  (2006.01)
*H04M 19/08*  (2006.01)

(52) U.S. Cl.
CPC ..................................... *H04M 19/08* (2013.01)

(58) Field of Classification Search
CPC ... H04M 11/06; H04M 11/002; H04M 9/001; H04M 1/723; H04M 3/42017; H04M 3/465; H04M 9/00; H04M 19/04; H04M 19/08; H04M 19/005; H04M 19/02; H04L 12/12; H04Q 3/00; H04B 3/54; H04B 1/58

USPC ........... 379/93.36, 102.04, 106.04, 169, 176, 379/186, 307, 318, 322, 323, 324, 348, 379/395.01, 413, 106.05, 106.09, 207.16, 379/211.03, 211.04, 252, 256, 375.01, 379/375.02, 413.01

See application file for complete search history.

(56) References Cited

U.S. PATENT DOCUMENTS

| 5,530,951 | A | * | 6/1996 | Argintar ....................... 379/67.1 |
| 5,920,846 | A | * | 7/1999 | Storch et al. ................. 705/7.14 |
| 6,025,999 | A | * | 2/2000 | Farrington et al. ............. 363/16 |

(Continued)

FOREIGN PATENT DOCUMENTS

| WO | 97/20426 | 6/1997 |
| WO | 2007/047006 | 4/2007 |

OTHER PUBLICATIONS

International Search Report for PCT/GB2008/001448, mailed Jun. 10, 2008.

(Continued)

*Primary Examiner* — Akelaw Teshale
(74) *Attorney, Agent, or Firm* — Nixon & Vanderhye PC

(57) ABSTRACT

The present exemplary embodiment relates to a remote powered node for a hybrid fiber-copper network. The node may be powered using the dormant copper pair(s) linking the node to the telephone exchange to carry a ringer current. The ringer current can be controlled to power all the electrical load of the node. Alternatively, the ringer current may power all of the components common to all customers served by the node, with the customers feeding power to their customer specific components via a UTP cable.

15 Claims, 3 Drawing Sheets

(56) References Cited

U.S. PATENT DOCUMENTS

| | | | |
|---|---|---|---|
| 2002/0015489 A1* | 2/2002 | Ben-David | 379/413 |
| 2004/0165889 A1* | 8/2004 | Mahony et al. | 398/71 |
| 2005/0147089 A1* | 7/2005 | Gerszberg et al. | 370/352 |
| 2005/0152338 A1* | 7/2005 | Chen et al. | 370/352 |
| 2006/0177044 A1* | 8/2006 | O'Neil et al. | 379/373.02 |
| 2007/0071198 A1* | 3/2007 | Salomon | 379/142.01 |
| 2008/0101342 A1* | 5/2008 | Bugenhagen et al. | 370/352 |
| 2010/0142601 A1* | 6/2010 | Flowers et al. | 375/222 |

OTHER PUBLICATIONS

Sinclair,—Institute of Electrical and Electronics Engineers: "The Issues and Practicalities of Providing Power to the Fiber Loop", Discovering a New World of Communications. Chicago, Jun. 14-18, 1992. vol. 3, Proceedings of the International Conference on Communications, New York, IEEE, US, vol. 4, Jun. 14, 1992, pp. 1789-1793, XP010061862.

\* cited by examiner

REMOTE POWERED NODE

This application is the U.S. national phase of International Application No. PCT/GB2008/001448 filed 24 Apr. 2008, which designated the U.S. and claims priority to European Application No. 07251850.9, filed 2 May 2007, the entire contents of each of which are hereby incorporated by reference.

TECHNICAL FIELD

The present exemplary embodiment relates to a remote powered node and, in particular, to a remote powered node in a communications network.

RELATED ART

The copper access network has been used for many years to provide basic telephony services. There has been a recent trend to also use the copper access network to provide broadband services, conventionally using digital subscriber line (DSL) technology. Typically this allows services having data rates of several Mbps to be supplied: the ADSL2 standard enables data rates of up to 12 Mbps and the ADSL2+ standard enables data rates of up to 24 Mbps.

One of the disadvantages of DSL is that the copper access networks that are used to support DSL were never designed to carry high-speed data services. Conventional telephony services are provided using an analogue signal that occupies a few kilohertz of the available frequency spectrum and the DSL signals are transmitted at higher frequencies, alongside the analogue telephony signals. The maximum data rate that can be achieved using DSL is limited by the length of the cable between the telephone exchange and the customer, the diameter of the copper wires and the condition of the network. This can make it difficult for a DSL supplier to provide a consistent level of service to different customers.

It is expected that there will be a demand for high-speed data services that can not be met by DSL-based services, for example, 100 Mbps and greater. It is believed that such data services are most likely to be supplied using optical fibre in part, or all, of the access network. This may be via conventional point-to-point fibre or by passive optical networks (PONS). PONS are a well-known network architecture in which optical splitters are used to connect a single optical fibre from a telephone exchange with multiple customers, with one PON typically serving between 16 and 128 customers (although significantly greater numbers of customers may be served from a single PON). A PON may be implemented such that the entire network consists of optical fibre (often referred to as Fibre To The Premises [FTTP]) or such that the fibre extends only part of the way from the exchange to the customer premises. Commonly, the fibre may extend to a street-side cabinet (sometimes referred to as a primary connection point (PCP)) or to a distribution point (DP) located at or near to a telegraph pole or underground link to the customer premises. The fibre will be terminated at a node that is connected to the customer premises using a pair of untwisted copper wires (referred to as UTP). In general, the greater the ratio of fibre to UTP, the greater the performance of the access network and the greater the cost of installing the network.

An issue that is associated with the use of such hybrid fibre-copper access networks is the issue of powering nodes in the network. These nodes may comprise, for example, opto-electronic converters, high-speed data modems, control circuits, etc. One solution to this problem is to provide a connection from the node to a source of main electricity, but this is costly to implement. A further option is to provide power cables in the ducts from exchange buildings along with communications cables, but the combination of communications cables and power cables carrying potentially significant levels of electrical power is a safety risk.

It is known to power network nodes from the customer premises (see, for example, the applicants co-pending application WO 2005/043880). However, when all customers are not providing power to the node, then it is not possible to test the functionality of the node or perform other maintenance tasks. DACS (Digital Access Carrier System) enables a remote node to be powered by sending 140V AC signals on the copper pair used to carry a digital communication signal (see below for further details).

BRIEF SUMMARY

US 2002/0015489 discloses a method of providing electrical power to power consuming devices in a customer premises. A power feeding unit is connected to the copper conductors in the customer premises such that electrical power is supplied to one or more power consuming devices, via the copper conductors. By providing the electrical power as a high frequency AC signal, for example above 20 kHz, then the operation of customer equipment and exchange equipment is unaffected.

According to a first aspect of the present exemplary embodiment, there is provided a remote node for a communications network, the remote node being connected to a copper access network, an optical fibre access network and a plurality of customer terminals, wherein, in use, i) the remote node is configured to receive communications data from the optical fibre access network; and ii) the remote node is configured to receive a ringing signal from the copper access network such that the remote node is powered by the ringing signal.

According to a second aspect of the present exemplary embodiment, there is provided a method of operating a communications network, wherein a remote node is connected to a copper access network, an optical fibre access network and a plurality of customer terminals, the method comprising the steps of: a) supplying communications data to the remote node via the optical fibre access network; and b) supplying a ringing signal to the remote node via the copper access network such that the remote node is powered by the ringing signal.

By supplying the remote node with the ringing current, which is conventionally used in the provision of telephony services, it is possible to supply power to the remote node using equipment that is already present in the local telephone exchange and that is no longer in use, as the optical fibre access network is being used to transmit data to customer terminals. Indeed, as the copper lines will be already connected to a ringer, there is no cost incurred in supplying power in this manner. Furthermore, the linesmen are familiar with working on live telephony lines and the use of the conventional ringing signal to power the remote node does not constitute an increased safety risk. It is also possible for a linesman to check that the ringing signal is providing power simply by making a telephone call to the number of the line in question.

BRIEF DESCRIPTION OF THE DRAWINGS

The present exemplary embodiment will now be described in greater detail with reference to the following figures, which are provided by way of example only, in which.

DETAILED DESCRIPTION OF EXEMPLARY EMBODIMENTS

Figure 1:
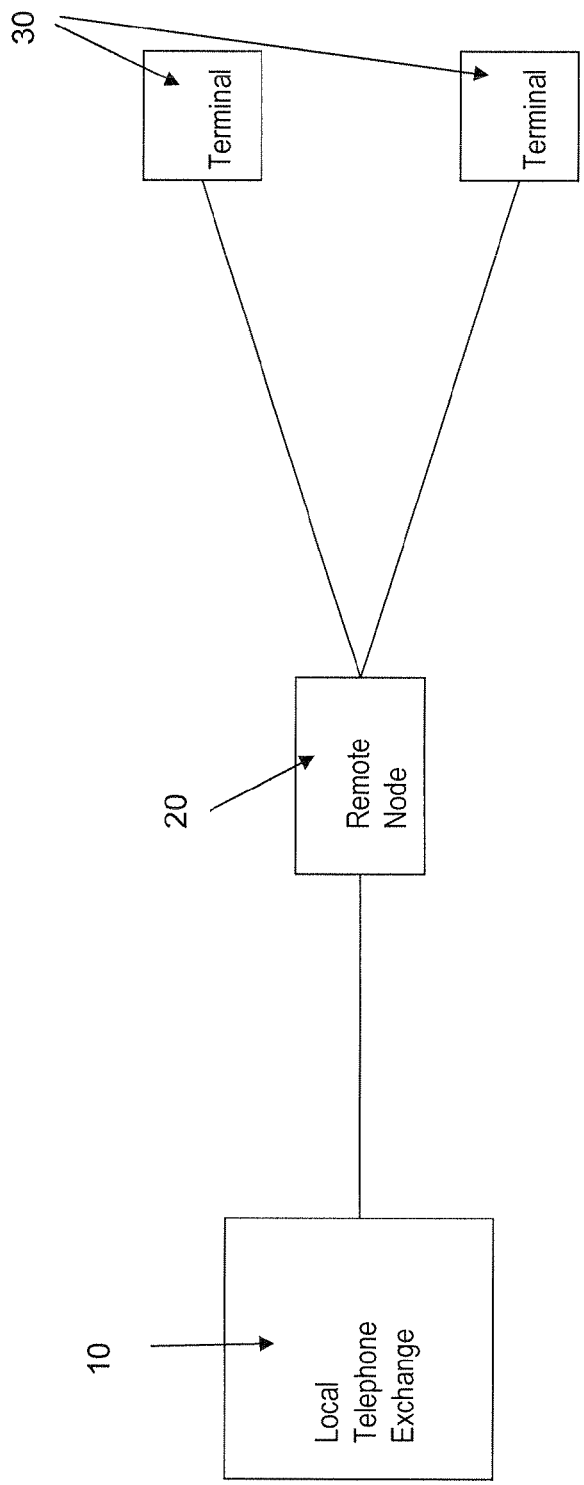
FIG. 1 shows a schematic depiction of a conventional network which uses a remote powered node to deliver DACS to customers over metallic cables.

FIG. 1 shows a schematic depiction of a conventional network which uses a remote powered node to deliver DACS to customers over metallic cables. The network comprises a local telephone exchange 10 which is connected to the remote node 20. The remote node 20 is connected to two customer terminals 30. DACS is a pair gain technology that allows a digital signal to be transmitted to the remote node: the remote node converts the received digital signal into analogue signals that can be separated and then transmitted to the respective customer terminal 30. Similarly, analogue signals from each of the customer terminals are sent to the remote node, where they are combined and converted into a digital signal that can be transmitted to the local telephone exchange 10. The remote node is powered using a 140V DC signal that is sent from the telephone exchange. Pair gain systems such as DACS allow the copper pair near to the exchange to be shared between two users. Conventionally, the remote node will be located as near to the customer terminals as possible, for example at the bottom of the telephone pole from which the customer terminals are supplied.

Figure 2:
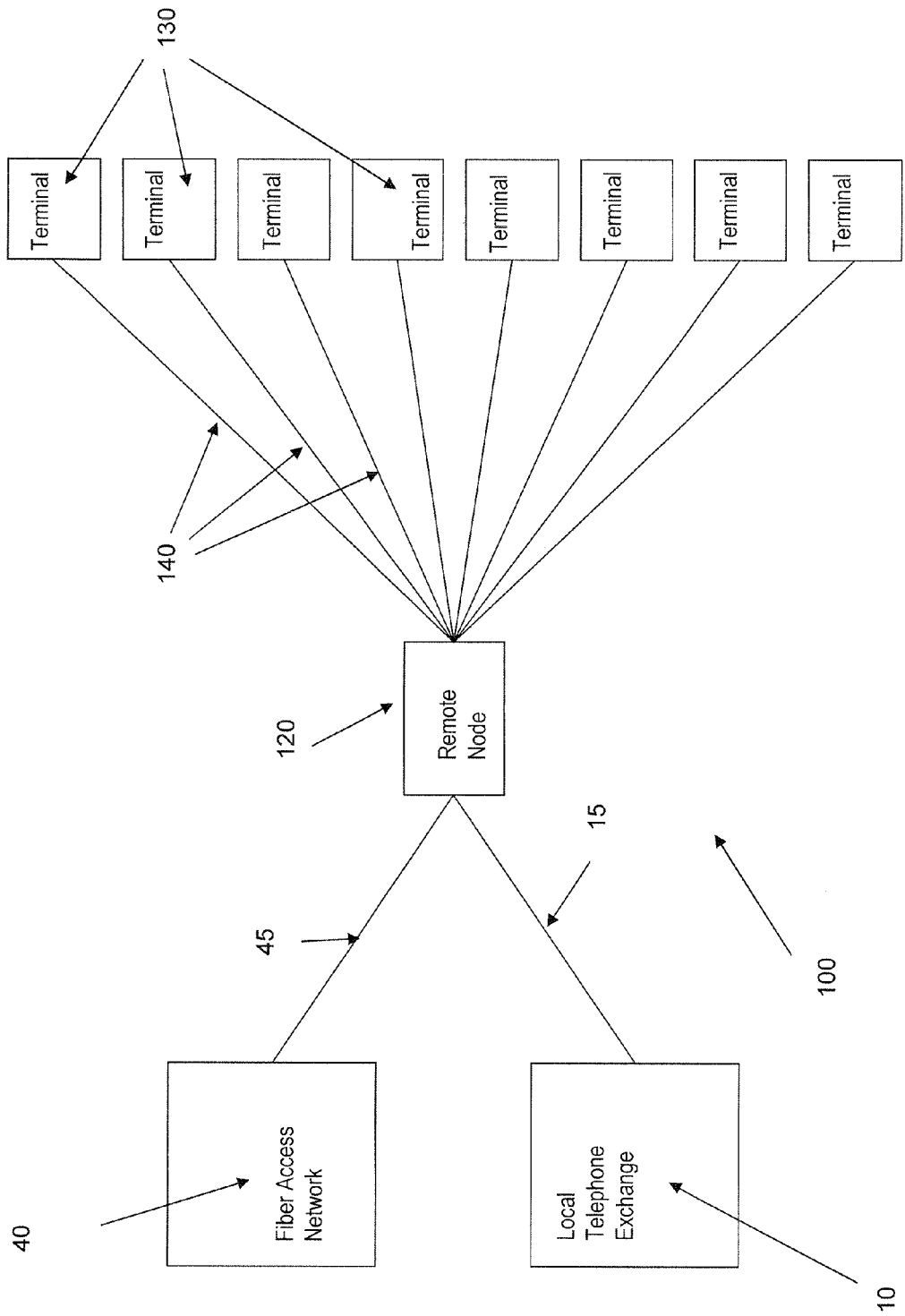
FIG. 2 shows a schematic depiction of a network comprising a remote powered node 120 according to the present exemplary embodiment.

FIG. 2 shows a schematic depiction of a network 100 comprising a remote powered node 120 according to the present exemplary embodiment. As discussed above with reference to FIG. 1, the remote powered node 120 is connected to local telephone exchange 10 by a copper cable 15. The node is connected to a plurality of customer terminals by a length of unshielded twisted pair (UTP) cable 140. The remote node is also connected to a fibre access network 40 via an optical fibre. The fibre access network 40 may have a point-to-point architecture or alternatively it may be a passive optical network (PON). The remote node 120 (see below) enables the optical signals to be received from the optical fibre access network 40, converted into electrical signals and then switched to the appropriate customer terminal. Similarly, the node receives signals from each of the plurality of customer terminals, multiplexes them together, converts them into an optical signal and then transmits them back to the optical fibre access network 40 via the optical fibre 45.

It will be understood that the remote node comprises some components that are unique to each of the customer terminals 130 which are connected to the node (VDSL line cards, etc.) and some components that are common to all of the customer terminals 130 (optical network terminal, data switch, etc.). While it may be possible for those components that are unique to each customer terminal to be powered from the respective customer terminals, this may not provide sufficient power to operate all of the common components. The powering solution used for DACS has a number of disadvantages: the use of the 140V DC supply represents a safety risk as it is significantly higher that the normal line voltages used in a telephone network. Furthermore, DACS requires the installation of a dedicated equipment rack with a jumper connection being made to the main distribution frame to connect the power supply to the line. The installation of the rack increases cost and there may not be space available in the telephone exchange to install the DACS equipment rack.

As the customer terminals are connected to the fibre access network 40 via the optical fibre 45, the copper cable to the local telephone exchange is no longer required to carry data. Therefore, in the present exemplary embodiment, the remote node 120 is powered via the copper cable 15. The node is powered using the conventional ringer signal. Typically, the ringer circuit uses a 75V AC signal to ring a telephone when a call is initiated, with the signal being added to any DC voltage already on the line. The ringer current can be rectified and smoothed by the remote node and used to power all the remote node components (or just the common components of the remote node).

Figure 3:
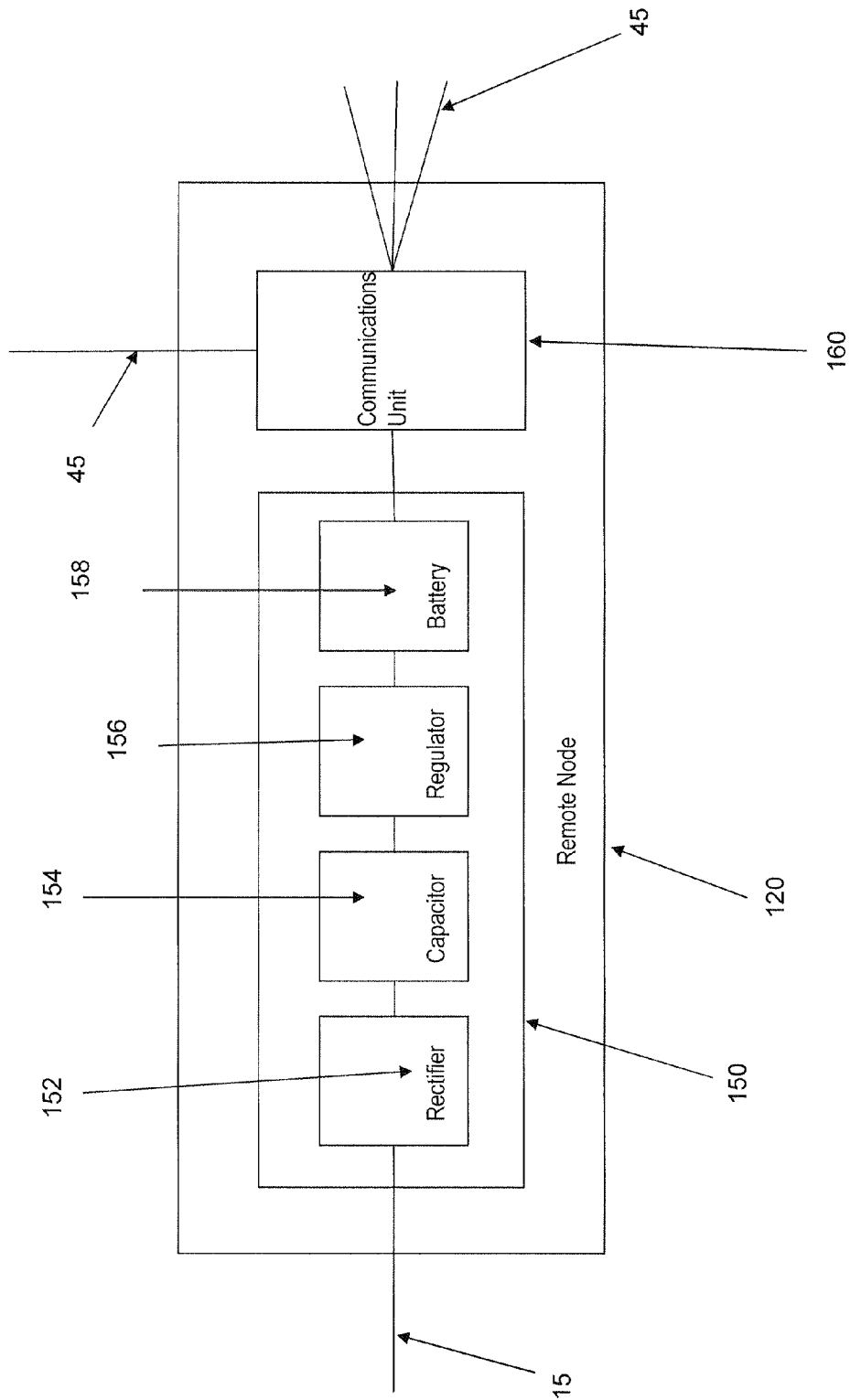
FIG. 3 shows a schematic depiction of a remote node according to the present exemplary embodiment.

FIG. 3 shows a schematic depiction of the remote node 120, which comprises a power supply unit (PSU) 150 and a communications unit 160. The PSU 150 is connected to the copper cable 15 that is connected to the local telephone exchange. The PSU comprises rectifier 152, capacitor(s) 154 and regulator 156. The PSU may further comprise a battery 158. The regulator 156 regulates the voltage supplied to the communications unit 160 and preferably further regulates the current supplied to the communications unit 160.

The communications unit 160 is connected to the optical fibre 45 to receive and transmit optical signals from and to the optical fibre access network. The communications unit is further connected to the plurality of consumer terminals via UTP cable 45. The PSU 150 may supply all of the power required to power the communications unit or alternatively some power may be supplied from the customer terminals via the UTP cables.

It will be understood that as a plurality of customer terminals are being served from the remote node, then there will be more than one copper line pair connecting the exchange to the remote node. Thus, if the remote node requires more power than can be supplied over a single copper line pair, then it is possible to make multiple connections to a remote node in order to provide sufficient electrical power. As the remote node is powered by the ringing current, it should be understood that it will be possible to control the amount of power delivered over a single line pair by varying the duty cycle of the ringing current.

When the remote node is installed, one or more copper pairs will be connected to the node. The linesman making the installation will be able to check that the appropriate ringing signal is being passed to the remote node by calling a number associated with that copper pair. It will be understood that conventionally the ringing signal is only applied to a copper pair when the number associated with that pair is being called. In order to provide continuous power to the remote node, then a ringing signal will need to be provided continuously. This can be achieved by using a network management system to send a signal to the local telephone exchange such that a ringing signal is continuously applied to the or each copper pair that is being used to power the remote node. This will not interfere with calls made to customers as their calls will be sent via the fibre access network.

What is claimed is:

1. A remote node for a communications network, the remote node being connected to a copper access network, an optical fibre access network and a plurality of customer terminals, wherein, in use, i) the remote node is configured to receive communications data from the optical fibre access network; and ii) the remote node is configured to receive a ringing signal from a telephone exchange through the copper access network such that the remote node is powered by the ringing signal, the ringing signal not being received by one of the plurality of customer terminals and the remote node being remote from the telephone exchange and the plurality of customer terminals.

2. A remote node according to claim 1, wherein the remote node is connected to the copper access network via one copper pair.

3. A remote node according to claim 1, wherein the remote node is connected to the copper access network via a plurality of copper pairs.

4. A remote node according to claim 1, wherein the node further receives power from one or more of the plurality of customer terminals.

5. A remote node according to claim 1, wherein the node further comprises means for rectifying and smoothing the ringing signal received from the copper access network.

6. A method of operating a communications network, wherein a remote node is connected to a copper access network, an optical fibre access network and a plurality of customer terminals, the method comprising the steps of:
   a) supplying communications data to the remote node via the optical fibre access network; and
   b) supplying a ringing signal from a telephone exchange to the remote node via the copper access network such that the remote node is powered by the ringing signal, the ringing signal not being received by one of the plurality of customer terminals and the remote node being remote from the telephone exchange and the plurality of customer terminals.

7. A method according to claim 6, wherein the ringing signal is supplied to the remote node via one copper pair.

8. A method according to claim 6, wherein the ringing signal is supplied to the remote node via a plurality of copper pairs.

9. A method according to claim 6, wherein the ringing signal is varied to vary the amount of power supplied to the node.

10. A method according to claim 9, wherein the duty cycle of the ringing signal is varied.

11. A method according to claim 6, wherein a control signal is applied to the telephone exchange in the copper access network, such that the ringing signal is continuously applied to the remote node.

12. A method according to claim 6, wherein power is further supplied to the remote node from one or more of the plurality of customer terminals.

13. A remotely powered node for use in a communications network, the remotely powered node comprising:
   a communications unit configured to communicate signals between an optical fiber access network and at least one user terminal; and
   a power supply unit, operatively coupled to the communications unit, configured to receive a ringing signal from a telephone exchange through a metallic cable so as to provide power to the communications unit to enable the communications unit to communicate the signals between the optical fiber access network and the least one user terminal;
   wherein the ringing signal is not received by one of the plurality of customer terminals and the remotely powered node is remote from the telephone exchange and the at least one user terminal.

14. The remotely powered as in claim 13, wherein the power supply unit does not receive data through the metallic cable.

15. A method of operating a remote node which is connected to (i) a metallic access network, (ii) an optical fibre access network and (iii) a plurality of customer terminals, the method comprising:
   receiving, from a telephone exchange, a ringing signal at the remote node via the metallic access network such that the remote node is powered by the ringing signal; and
   communicating data at the remote node between the optical fibre access network and the plurality of terminals as enabled by the power of the received ringing signal;
   wherein the ringing signal is not received by one of the plurality of customer terminals and the remote node is remote from the telephone exchange and the customer terminals.

\* \* \* \* \*